United States Patent [19]

Smearing

[11] 4,273,689

[45] Jun. 16, 1981

[54] FILLED, TWO-PART PLASTIC-PRODUCING SYSTEM

[75] Inventor: Robert W. Smearing, Ballston Lake, N.Y.

[73] Assignee: General Electric Company, Waterford, N.Y.

[21] Appl. No.: 62,161

[22] Filed: Jul. 30, 1979

[51] Int. Cl.$^3$ ............................................. C08L 67/02
[52] U.S. Cl. ................... 260/22 CB; 106/90; 206/219; 525/10; 525/49
[58] Field of Search ................... 260/22 CB; 206/219; 106/90; 405/233; 525/10, 49

[56] References Cited

U.S. PATENT DOCUMENTS

| | | | |
|---|---|---|---|
| 3,324,663 | 6/1967 | McLean | 260/22 CB |
| 3,462,514 | 8/1969 | Kurkowski et al. | 525/49 |
| 3,736,278 | 5/1973 | Wada et al. | 260/22 CB |
| 3,766,079 | 10/1973 | Jackman et al. | 206/219 |
| 3,902,596 | 9/1975 | McVay | 206/219 |
| 3,947,615 | 3/1976 | Fry | 525/49 |
| 4,026,965 | 5/1977 | Roberts | 260/22 CB |
| 4,096,944 | 6/1978 | Simpson | 206/219 |

FOREIGN PATENT DOCUMENTS 2408524  8/1974  Fed. Rep. of Germany ............. 525/10

*Primary Examiner*—Ronald W. Griffin
*Attorney, Agent, or Firm*—Morgan, Finnegan, Pine, Foley & Lee

[57] ABSTRACT

A filled, two-part plastic-producing system is described. This system is based on the use of unsaturated polyester resin and a benzoyl peroxide paste curing agent. By modification of either or both parts of the system, its utility is greatly enhanced. Further a cement composition useful in a filled two-part grout-producing system is described.

20 Claims, No Drawings

FILLED, TWO-PART PLASTIC-PRODUCING SYSTEM

BACKGROUND OF THE INVENTION

Filled, two-part plastic-producing systems have assumed a position of major commercial importance. These systems are utilized throughout industry in applications ranging from the production of small molded articles, road surface coatings, and grouting (or mine bolt) for support of mine roof. The two parts of these systems are often packaged together to facilitate their use as, for example, a plastic or cement grouting. A representative embodiment of a cement grouting is described in U.S. Pat. No. 4,096,944 of Robert E. Simpson, the disclosure of which is incorporated herein by reference. Various plastic or hardening resin systems are also described in U.S. Pat. No. 4,096,944.

The first of the two basic parts of the plastic-producing systems comprises the combination of an unsaturated polyester resin and a vinyl monomer cross-linking agent. Ordinarily, these ingredients are combined in a weight ratio of between 9:1 to 1:4, still more usually 3:1 to 2:1, of resin to monomer to optimize cross-linking.

Suitable unsaturated polyester resins are well known. They have commonly been prepared by condensation of unsaturated polycarboxylic acids such as maleic, fumeric, aconitic and the like (or, if available, the corresponding anhydrides) with polyhydric alcohols such as ethylene glycol, butanediol and the like.

The vinyl monomers are likewise well known. Any compound contaning a polymerizable

group may be employed. Representative preferred examples are compounds having a boiling point of at least 60° C., such as styrene.

The second basic part of this system comprises a curing agent. Such agents, which initiate the cross-linking reaction between resin and vinyl monomer, are also well known. They include all types of free radical generators. Most commonly, however, benzoyl peroxide is employed because of its accepted advantages. While benzoyl peroxide alone may be employed, it is usually present in the form of a paste prepared by admixture with a liquid carrier such as a plasticizer or other diluent. This greatly increases the performance of the peroxide in initiating curing of the resin.

In addition to the already described ingredients of the present two-part systems, there is the filler. This essential ingredient may be present in either or both of these separate parts. It may be composed of any essentially inert, solid substance including, for example, clay, talc, wood flour and limestone. The filler generally constitutes between about 10% and 200%, more usually 50% and 160%, by weight of the first (resin plus vinyl monomer) part of the system. It is incorporated to supply both bulk and strength to the ultimate, cured resin or plastic product.

These two-part systems may, in addition to the foregoing, contain any of a large number of well known optional additives. These additives are useful in improving such systems or their products and include, merely by way of example, lubricants, resin rheology adjusters, pigments and the like.

While the conditions necessary for cure of resin in such systems may vary widely, the ingredients of the two parts are ordinarily and conventionally selected to provide for rapid cross-linking under ambient temperature. More specifically, the systems are designed to effect essentially complete curing within about 15 minutes at 30° C. or less. This allows the two parts to be admixed, often in situ, and the cured or cross-linked plastic product then promptly produced without need for adjustment of reaction conditions.

Despite the well known and commercial nature of these filled, two-part plastic-producing systems, various drawbacks to their usage remain. This is particularly true where specialized applications are concerned. A recurrent problem of those systems relates to the use of benzoyl peroxide pastes. Such pastes tend to deteriorate and aften have a minimal shelf life. This obviously limits the manner in which they may be used.

A related drawback involves limits on effective activity. It has frequently been the case with these two-part plastic systems that separations of individual ingredients and/or mechanical limitations on admixture result in less than efficient utilization of benzoyl peroxide and/or lack of homogeneous products. This leads to increased cost and the potential for structural weaknesses.

Yet another drawback exists where it is sought to achieve castings of molded products. These two-part systems generally undergo significant shrinkage upon curing under ambient conditions. In addition, they have generally required the use of expensive metal molds where higher temperatures were utilized. As a consequence, they have not achieved optimum usage.

In the prior art two-part grout-producing system, as for example the cement system disclosed in U.S. Pat. No. 4,096,944 to Simpson, hydraulic cement is encased in a two-part rupturable bag with microencapsulated water. The resulting package, by virtue of the use of microencapsulated water, is expensive, and the encapsulating shells may not be completely impervious to water.

Despite the levels of use already achieved by filled, two-part plastic and grout producing systems, the foregoing and other drawbacks have exerted severe commercial limitations. It is therefore an object of this invention to minimize and/or overcome these and other problems as are discussed below.

DESCRIPTION OF THE INVENTION

In accordance with the present invention, it is desired to ensure the homogeniety and stability of cured plastic products made from filled, two-part plastic-producing systems. A means for achieving this objective involves modification of the composition of conventional second part curing agent pastes of benzoyl peroxide.

Such pastes have heretofore ordinarily been composed of benzoyl peroxide and a carrier which was essentially an inert diluent. Thus the carrier might comprise, for example, an unreactive plasticizer such as chlorinated paraffin wax or diisobutyl phthalate or even mineral oil, or water or admixtures thereof.

The stability of the benzoyl peroxide pastes of present systems is improved by incorporation of stearate salts. Suitable such salts are sodium, calcium and zinc stearates (or admixtures thereof such as, for example, commercial Ivory Snow). These salts may be added to the curing agent pastes in an amount of between 0.2 to 5%, more desirably 0.5 to 2% by total weight. Because of the rheological characteristics these salts impart to a paste, they result in an increase in physical stability. Thus, problems of separation and non-homogeniety are greatly reduced as compared to otherwise conventional systems.

Moreover, the salts also allow modification of the constituent(s) of conventional pastes. This includes addition of inexpensive diluents and/or partial replacement of expensive carriers such as plasticizer. With stearate salts present, stable pastes containing, for example, between 5% and 40% water and/or between 10% and 30% mineral oil by weight may be produced. Not only does this reduce cost but, as previously discussed, improves curing performance by increasing the bulk volume of the second (curing agent) part of the system relative to that of the first (resin) part.

The present invention may also derive improvement through modification of the first or resin-containing part of the system. In conventional systems, the resin and vinyl monomer constituents of this part are ordinarily present in stoichiometrically determined proportions. Thus, the amount of vinyl monomer present is generally that which will react completely with, in cross-linking, the polyester resin. It has been discovered, however, that cured plastic products may be obtained, without loss of strength and at reduced expense, by including within this first part an excess of vinyl monomer and of additional glycol. For this purpose, up to 20%, desirably between 5% and 20%, of vinyl monomer in excess of the theoretical stoichiometric requirement may be employed. Most preferably, the vinyl monomer utilized is styrene, although others may be employed in whole or part. The glycol should be present in an amount of up to 30%, preferably between 15% and 30%, by total weight. Any liquid alcohol, polyol or glycol may be utilized, although glycols are preferred.

In adding these ingredients to the first part of the system an obvious dilution of resin concentration takes place. Despite this face, however, little or no reduction in cured plastic strength occurs. Therefore this aspect offers a means for substantial reduction in system cost without detriment to its performance.

Yet another discovery in accordance with the present invention is of a means for reducing the shrinkage of the present systems during resin cure. This aspect of the invention is particularly important for applications relating to the provision of a small parts molding composition. There, significant shrinkage cannot be tolerated because the resultant plastic products may become subjected to internal stress, cracking or failure to meet critical physical tolerances. This aspect of the invention involves the use of fumarate orthophthalate as the unsaturated polyester resin in the first part of the present systems. This particular resin, preferably where condensed with styrene and/or vinyl toluene has been found to undergo very low shrinkage on curing. The total volume of such systems generally changes less than 1% on curing to a solid plastic product. Moreover, up to 30% polyvinyl acetate may be incorporated into the first (resin) part of the system to achieve still further reduction in shrinkage.

Another advantage of systems based on fumarate orthophthalate polyester resin is that they undergo complete cure at ambient temperature in a very rapid time. Ordinarily, for example, such cure is achieved in less than 120 seconds at 25° C. This makes systems containing fumarate orthophthalate highly desirable for a wide variety of uses.

These discoveries render fumarate orthophthalate containing systems particularly suitable for use as an improved molding composition. Their low shrinkage makes possible high precision castings which is especially important in the production of a variety of small plastic parts having critical dimensional tolerances.

While enabling greater precision in small parts castings, the present systems also facilitate their production. Unlike many prior art compositions, fumarate orthophthalate systems do not require expensive metal molds capable of withstanding elevated curing temperatures. Instead, these systems may be employed in wholly ambient temperature or slightly elevated temperature processes utilizing less stable molds such as ones made from epoxies, silicones, wood or other inexpensive materials. Moreover, these ambient conditions and the rapid speed of curing make these systems particularly suitable for mass production techniques. Thus, they offer numerous advantages over older, conventional plastic-producing systems.

When used for support of a mine roof, the present mine bolt system or resin grouting is employed in combination with a beaded reinforcing rod. Together, these two components supply the requisite degree of stabilization. Another aspect of this invention relates to a novel cement composition which, like the previously described grouting system, is composed of two separate parts. Indeed, it is even packaged together in a composite film bag as described, for example, in previously mentioned U.S. Pat. No. 4,096,944. In such a bag, both parts of the cement are separately enveloped by a polymeric film (preferably with one bag within the other, so that one part of the cement fills the interstitial volume). This results in separation of the two parts by the polymeric film. The parts may then be admixed, generally at the site of application, by rupturing the separating film.

In accordance with this embodiment of the present invention, the two essential constituents of the respective cement parts are alpha-gypsum cement and gelled water. They may be admixed in approximately equal volume amounts (or about a 2:1 weight ratio, respectively) to produce a rapidly setting paste having sufficient physical integrity to prevent sagging within a few seconds.

The first part of the cement composition may consist solely of alpha-gypsum cement. It is preferred, however, for it to include an accelerator to insure rapid curing. For this purpose any of the known such materials, including for example, potassium sulfate, may be employed. These materials may be present in an amount of up to about 10%, preferably between 1% and 5%, by weight of the alpha-gypsum cement.

The second or gelled water part of the cement composition may comprise water and virtually any of the well-known gelling agents therefore, including, for example, Carbopol resins. These ingredients are desirably present in amounts sufficient to produce a material that has sufficient flow capabilities for eventual admixture and reaction with the gypsum.

Through utilization of the present two-part cement compositions, particularly as mine bolt anchors, substantial savings in material costs are achieved. Moreover, these materials are more simply utilized than the conventional ones they replace and provide at least equivalent functions and properties.

DESCRIPTION OF THE PREFERRED EMBODIMENTS

The following examples are given by way of illustration only and are not intended as limitations on the scope of this invention. Many apparent variations are possible without departing from its spirit and scope. Unless otherwise specified herein, all proportions are provided on a weight basis.

EXAMPLE 1

A benzoyl peroxide paste suitable for use in a mine bolt resin system is modified to the following composition:

Benzyl Peroxide paste: 40.00%
Water: 4.17%
Mineral Oil: 11.25%
Sodium Stearate: 1.00%
Precipitated $CaCO_3$: 15.43%
Ground limestone: 28.15%

Despite these significant increases in both carrier and filler composition, the modified paste retains a creamy viscosity and does not exhibit signs of separation on storage. In subsequent tests for cure of a conventional first (resin) part of a mine bolt system, the modified paste proves highly satisfactory.

EXAMPLES 2-3

Benzoyl peroxide curing agent having the following compositions are prepared:

A

Benzoyl peroxide (22% $H_2O$): 25.63%
Diisobutyl phthalate: 9.74%
Tergitol: 0.33%
Mineral Oil: 19.72%
Sodium stearate: 1.00%
Precipitated $CaCO_3$: 15.43%
Ground limestone: 28.15%

B

Benzoyl peroxide paste: 40.00%
Mineral Oil: 15.42%
Ivory Snow: 1.00%
Ground limestone: 43.58%

The results of these compositions after storage, and with conventional first (resin) parts are similar to those achieved in Example 2.

EXAMPLE 4

An improved first part mine bolt resin formulation according to this invention is prepared having the following compositions:

Unsaturated polyester resin: 16.535%
Styrene: 2.918%
1,4-Naphthoquinone: 0.0075%
Fumed silica: 0.249%
Diethylene glycol: 4.876%
Powdered coal: 2.488%
Precipitated $CaCO_3$: 7.960%
Ground limestone: 64.975%

On curing with a conventional benzoyl peroxide paste, the system surpasses normal strength requirements. This, despite reduction from normal resin percentage levels through addition of excess styrene and of glycol.

EXAMPLE 5

An improved first part mine bolt resin formulation according to this invention is prepared having the following composition:

Unsaturated polyester resin: 11.950%
Styrene: 3.585%
1,4-Naphthoquinone: 0.006%
Fumed silica: 0.228%
Diethylene glycol: 6.664%
Powdered coal: 2.282%
Precipitated $CaCO_3$: 15.974%
Ground limestone: 59.311%

On test curing, improved results, similar to those set forth in Example 4 are obtained.

EXAMPLE 6

An improved first part filled resin formulation according to this invention is prepared having the following composition:

Fumarate orthophthalate polyester resin: 14.7%
Styrene: 6.3%
Polyvinyl acetate solution, 40% in styrene: 9.0%
Fumed silica: 0.3%
Precipitated $CaCO_3$: 6.97%
Ground limestone: 62.73%

The formulation is catalyzed with benzoyl peroxide paste and injected into silicone molds for fluorescent lamp bulb end caps. The resin system cures in seconds at room temperature and finished plastic product easily ejects from the mold.

The resultant end caps evidence less than 1% shrinkage from initial system volume. As a result, there is a significant reduction in stress and breakage of the glass tube ends compared to thermally cured plastic caps.

EXAMPLE 7

A two-part cement composition is prepared having the following composition:

First Part

Alpha-gypsum cement: 95.5%
Potassium sulfate: 1.5%
Fumed silica: 3.0

Second Part

Water: 97.4%
Carbopol 940: 0.5%
Triton X-45: 2.1%
Amonium hydroxide (trace)

The second part, comprising gelled water, is packaged inside a polymeric film bag contained within a second such larger bag also holding the first (gypsum) part of the composition.

On storage testing, the composition shows none of the normal, slow release of water. Consequently, there is no premature setting of the cement. This result is attributed to the fact that the polymer film is impervious to water in the gelled state.

On rupture of the two bags and admixture of their contents, a rapidly setting paste is obtained. Within seconds, the paste develops sufficient physical integrity to prevent sagging.

While the present invention has been described with reference to certain of its preferred embodiments, it is understood that numerous modifications may be made by those skilled in the art without departing from its scope. Therefore, the appended claims are intended to cover all such equivalent modifications as come within the true scope of this invention.

I claim:

1. A filled two-part plastic-producing system comprising:
   (i) (a) unsaturated polyester resin which is at least 30% by weight fumarate polyester, and (b) vinyl monomer and (c) up to 30% by total weight of alcohol, said vinyl monomer present in an amount of from 5% to 20% in excess of that required for curing said resin; and
   (ii) a curing agent paste of benzoyl peroxide in a liquid carrier, said curing agent paste containing between 0.2% and 5% by total weight of stearate salt, at least one of components (i) and (ii) additionally containing an essentially inert filler.

2. The system of claim 1, wherein the fumarate polyester comprises fumarate orthophthalate or diethylene glycol fumarate.

3. The system of claim 1, wherein the stearate salt is selected from the group consisting of sodium stearate, calcium stearate, zinc stearate and admixtures of any of the foregoing.

4. The system of claim 1, wherein the curing agent paste contains between 5% and 40% water by total weight.

5. The system of claim 1, wherein the curing agent paste contains between 10% and 30% mineral oil by total weight.

6. The system of claim 1, wherein the alcohol is selected from the group consisting of aliphatic alcohols, polyols, glycols and admixtures thereof.

7. The system of claim 1, wherein the vinyl monomer is selected from the group consisting of styrene, vinyl toluene and admixtures thereof.

8. The system of claim 7, wherein the vinyl monomer is styrene.

9. The system of claim 8, wherein component; additionally contains up to 15% by total weight of polyvinyl acetate.

10. In a filled, two-part plastic-producing system containing:
    (i) unsaturated polyester resin and vinyl monomer; and
    (ii) a curing agent paste of benzoyl peroxide in a liquid carrier; at least one of components (i) and (ii) additionally containing an essentially inert filler, the improvement wherein said curing agent paste contains between 0.2% and 5% by total weight of stearate salt.

11. The system of claim 10, wherein the stearate salt is selected from the group consisting of sodium stearate, calcium stearate, zinc stearate and admixtures of any of the foregoing.

12. The system of claim 10, wherein the curing agent paste contains between 6% and 40% water by total weight.

13. The system of claim 12, wherein the curing agent paste contains between 10% and 30% mineral oil by total weight.

14. In a filled, two-part plastic-producing system containing:
    (i) unsaturated polyester resin and vinyl monomer; and
    (ii) a curing agent paste of benzoyl peroxide in a liquid carrier;
    at least one of components (i) and (ii) additionally containing an essentially inert filler, the improvement wherein said system additionally contains up to 30% by total weight of alcohol and said vinyl monomer is present in an amount of from 5% to 20% in excess of that required for curing said resin.

15. The system of claim 14, wherein the alcohol is selected from the group consisting of aliphatic alcohols, polyols, glycols and admixtures thereof.

16. The system of claim 15 wherein said alcohol is present in an amount of from 15% to 30% of the total weight.

17. The system of claim 15, wherein the vinyl monomer is styrene.

18. In a filled, two-part plastic-producing system containing:
    (i) unsaturated polyester resin and vinyl monomer; and
    (ii) a curing agent paste of benzoyl peroxide in a liquid carrier; at least one of components (i) and (ii) additionally containing an essentially inert filler, the improvement wherein said unsaturated polyester resin is at least 30% by weight fumarate orthophthalate polyester.

19. The system of claim 18, wherein the vinyl monomer is selected from the group consisting of styrene, vinyl toluene and admixtures thereof.

20. The system of claim 19, wherein the first part additionally contains up to 30% by total weight of polyvinyl acetate.

* * * * *

UNITED STATES PATENT AND TRADEMARK OFFICE
CERTIFICATE OF CORRECTION

PATENT NO. : 4,273,689

DATED : June 16, 1981

INVENTOR(S) : Robert W. Smearing

It is certified that error appears in the above—identified patent and that said Letters Patent are hereby corrected as shown below:

In column 7, at line 39, "component;" should read -- component (i) --.

Signed and Sealed this

Twenty-third Day of March 1982

[SEAL]

Attest:

GERALD J. MOSSINGHOFF

Attesting Officer — Commissioner of Patents and Trademarks